E. N. JENKINS.
Lantern.
No. 2,462. Reissued Jan'y 15, 1867.
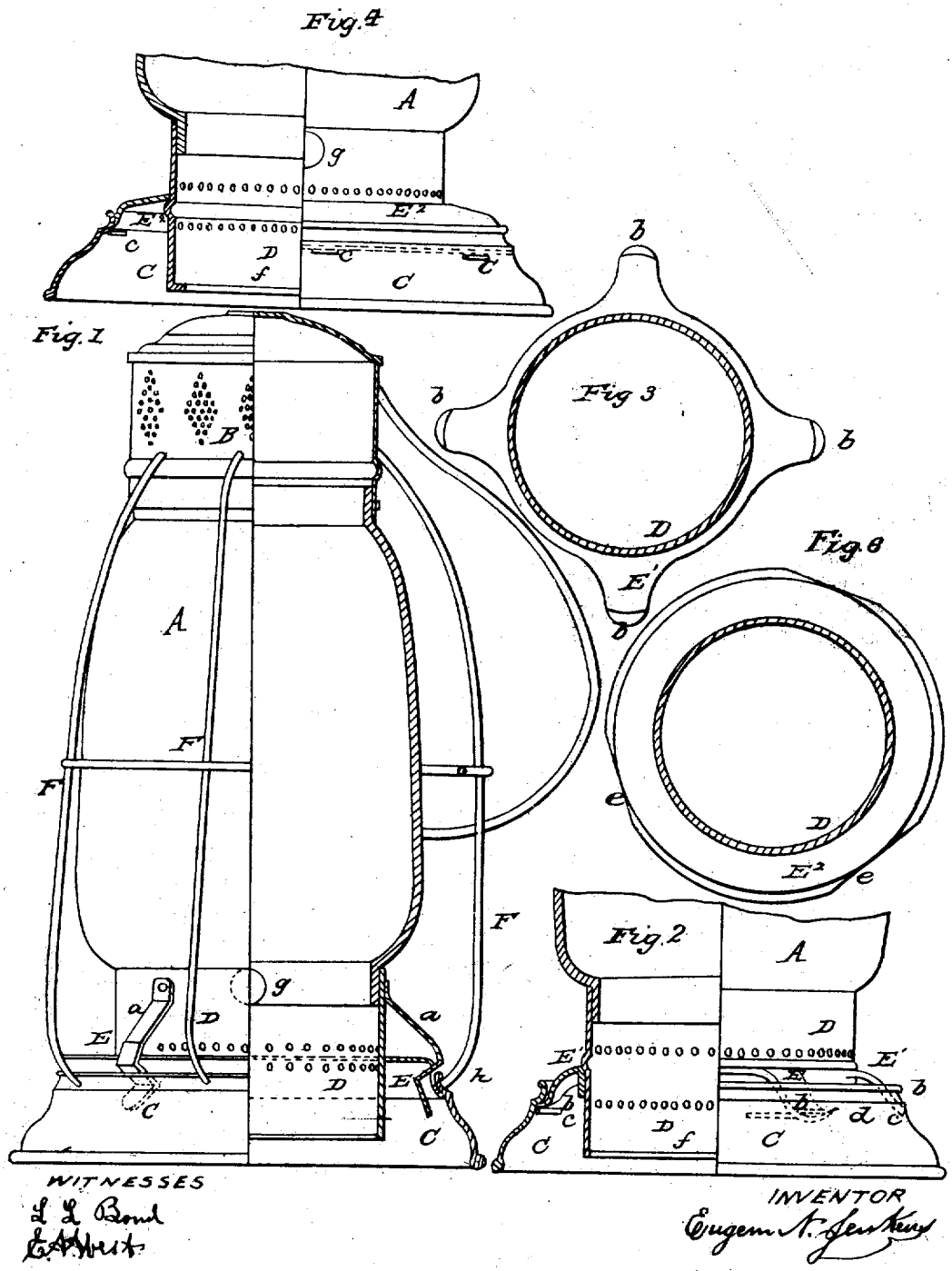
WITNESSES
L L Bond
E A West
INVENTOR
Eugene N. Jenkins
N. PETERS, Photo-Litiographer, Washington, D. C.

United States Patent Office.

EUGENE N. JENKINS, OF CHICAGO, ILLINOIS.

*Letters Patent No.* 56,567, *dated July* 24, 1866; *reissue No.* 2,462, *dated January* 15, 1867.

IMPROVEMENT IN LANTERNS.

The Schedule referred to in these Letters Patent and making part of the same.

TO ALL WHOM IT MAY CONCERN:

Be it known that I, EUGENE N. JENKINS, of the city of Chicago, in the county of Cook, and State of Illinois, have invented certain new and useful Improvements on Lanterns; and I do hereby declare that the following is a full, clear, and exact description of the construction and operation of the same, reference being had to the accompanying drawings, making a part of this specification, in which—

Figure 1 is a perspective view, with one quarter removed vertically.

Figure 2 is a front view of the base, with the guards and upper portion of the globe removed; also, a vertical quarter showing the band and disk loosely connected.

Figure 3 is a top view of the plate or disk $E^1$ detached.

Figure 4, a front view of the base, similar to fig. 2, showing a different plate or disk; and Figure 6, a top view of the plate or disk $E^2$ detached.

Like letters refer to similar parts in the several figures.

The nature and object of my invention consist in constructing the base of a lantern so that the globe will be firmly supported by a band and disk or plate, which can be removed through the bottom of the lantern without detaching such band from the globe, so that the globe may be removed with safety whenever desired, and the strength of the lantern preserved in all of its parts, and in so constructing the base of the lantern that none of the parts can be displaced without leakage, as the guard-rods are extended down to the bottom or flange portion of the base, and by extending them down to the bottom of the lantern the entire weight of the globe lamp pot, and all other parts not connected with the cap or dome, are supported and protected by the guard.

To enable others skilled in the art to make my invention, I will proceed to describe its construction and operation.

The cap or dome B of the lantern is constructed in any of the known forms and of any suitable material. Any of the known forms of globes A may also be used, but I prefer the cylindrical, conical, or oblate to the spherical, as they make the completed lantern in better proportion. The broad or bottom part of the base C is made narrow, as shown, (the figures being full size,) and the opening at the top a little larger than the largest diameter of the globe. The guard F is extended down to the bottom and attached to this band, as shown at *h*, fig. 1. The band D is made to project above the top of the band C, and fitted around the neck of the opening or mouth of the globe. To this band D I attach a disk or plate, E, which is either soldered or attached by a close-fitting joint, as shown at E, and fills the space between the band D and the base C. As the band D and disk E support the globe and the oil-cup, it becomes necessary to give them a firm support on the base C. This can be done in a variety of ways. In fig. 1 they are supported by the springs *a a*, which are attached to D by a slight change of form. The springs may be attached to C or E. In modification shown at figs. 2 and 3, they are supported by the ledges or projections *c*, and kept in place by the horizontal spring *d*. The disk $E^1$, in this form, is made of cast iron or other suitable material, and cut away so as to leave simply projections to make the connection between D and C, leaving open spaces between them for the passage of air. In this the disk is also separate from the band D, and is loosely attached to it. In the modification shown at figs. 4 and 6, the disk $E^2$ is cut away at *e* so as to pass the ledges *c*, when by a slight or considerable turn it is passed over them and securely held in place. In the form shown at fig 2, a slight turn is also necessary to secure the disk, and so much of it being cut away it is necessary to secure it from further turning, which is done by the spring *d*. In the form, fig. 1, no turning is required, as it will be firmly held wherever inserted. The oil-cup is held in place by springs resting on the ledge *f*, and can be first withdrawn, or be withdrawn with the band and disk. When the springs are compressed on the disk and band turned, the disk, band, and globe come down through the bottom, and coming down with a natural motion, and all attached together, there is less liability of breaking the globe than when the lantern is disconnected in several places or parts. This form also enables me to make the wick-ratchet project through the opening *g* with a short stem or shaft, as it materially contracts that part usually called the base at this point. The air-holes or projections are also made in the band D, and are made above and below the disk E, so that whatever motion is given to the lantern a sufficient supply of air will be furnished.

It will be obvious that this makes a complete and cheap lantern, as there are but very few parts used in its construction, and these in the simplest forms, and the connections and guards such as to make it safe and strong and a decided improvement upon the lantern of J. H. Miltimore, which is owned by me, as will appear from the records of the office.

Having thus fully described my lantern, what I claim as new, and desire to secure by Letters Patent, is—

1. The band D provided with a plate or disk E for supporting the lantern globe, substantially as specified.

2. The combination of the band D, disk E, springs *a*, or ledges *c*, with the base C, substantially as and for the purposes specified.

3. Extending the guard-rods F, and connecting them directly to the bottom or flanged part of an annular base, having an opening in it sufficiently large to allow the globe to pass through it, substantially as set forth and shown.

EUGENE N. JENKINS.

Witnesses:

JAS. E. CROSS,

H. L. BUTLER.